(12) United States Patent
Chang

(10) Patent No.: US 6,377,147 B1
(45) Date of Patent: Apr. 23, 2002

(54) LIQUID MAGNETIZER

(76) Inventor: Hung-Cheng Chang, P.O.Box No. 6-57, Chung-Ho City, Taipei Hsien (TW)

( * ) Notice: Subject to any disclaimer, the term of this patent is extended or adjusted under 35 U.S.C. 154(b) by 0 days.

(21) Appl. No.: 09/927,381

(22) Filed: Aug. 13, 2001

(51) Int. Cl.[7] ............................... H01F 7/02; C02F 1/48
(52) U.S. Cl. ........................ 335/296; 335/297; 335/306; 335/284
(58) Field of Search .................... 335/296–306; 210/222, 223, 695; 123/536, 538; 324/318–320

(56) References Cited

U.S. PATENT DOCUMENTS 4,673,882 A * 6/1987 Buford ........................ 324/320

* cited by examiner

Primary Examiner—Ramon M. Barrera

(57) ABSTRACT

The present invention comprises two magnets and two "T" shaped metal plate structures, magnets placed between the protruding sections of the metal plates, so that the said magnets fit into the indented space made by the two protruding sections, and, moreover, the poles of the two magnets are placed so that each pole faces a pole with the same magnetic pole, and the inner curved area of protruding sections of the metal plates is made to fit against the piping. Because each of the metal plates is fitted with magnets with differing magnetic poles, the magnetic field is able to more effectively penetrate the piping, so that when the liquid is flowing in a lengthwise motion through the area of the magnetizer, the effectiveness of the magnetization process is increased.

3 Claims, 7 Drawing Sheets

LIQUID MAGNETIZER

BACKGROUND OF THE INVENTION

1. Field of the Invention

The present invention is directed to a liquid Magnetizer, more particularly, a device to be installed with the purpose of increasing the magnetization of liquids.

2. Description of the Prior Art

In the relative fields of industrial water treatment a magnetizer is attached to piping, so that the lengthwise flow of liquid undergoes a change in attributes, and in this way the efficiency of heat transfer is increased and corrosion is prevented. This process also acts to increase the power of engines and to change the length of time a reaction takes to occur from the time the chemicals come into contact with each other.

Of course, the action of installing a magnetizer results in a much higher degree of magnetization of the liquid, and in general has a significantly beneficial effect. Nevertheless, besides the degree of power in the magnets of the installed magnetizer, the decision most effecting the process is that relating to the radius of the piping. Currently, there are many different types of magnetizers available. Set out below is a description of some of these:

In FIG. 1 it can be seen that a liquid magnetizer has been assembled by affixing magnet 10 by means of curved metal plate 20 to piping 30, so that magnet 10 acts to create a magnetic field able to penetrate piping 30, and in this way the liquid is magnetized.

In FIG. 2 it can be seen that a liquid magnetizer has been assembled by inserting two magnets 10 (each with a matching set of magnetic poles) into "U" shaped holder 21, and in this way acts to both create an attracting magnetic force within the metal of piping 30, and to make use of magnets 10 magnetic field to penetrate piping 30, and in this way the liquid is magnetized.

In FIG. 3 it can be seen that a liquid magnetizer has been assembled by means of assembling together magnets 10 to make a magnet set, so that a plurality of the said magnet sets are distributed around the outer wall of piping 30, and which are set in place by means of metal bands 22. In this way the magnetic field is distributed in a stable manner around the interior of piping 30.

Although the present invention is not directly related to the shape of the piping, it can be seen that the liquid magnetizers described above offer an inadequate solution in respect to the distribution of the magnetic field, in that very little, if any, magnetic force manages to penetrate into the interior of the piping. Because the effectiveness of magnetizing varies in inverse proportion to the distance from which the object to be magnetized is from the magnetizer, the magnetic field effectively fails to penetrate into the center of the pipe, so that even if a more powerful magnet is used, the degree of magnetization is limited. Furthermore, due to the structural limitation, the size applied to the magnet and cross-sectional of the pipe for the said conventional magnetizer is also limited.

SUMMARY OF THE INVENTION

The primary objective of the present invention is to provide a liquid magnetizer, more particularly, to increase the effect of the magnetization process on the liquid, and comprising two magnets and two metal plates (material should be of a type that can be magnetized), wherein, the metal plates appear in cross section as a "T" shape with two concave sections on either side, so that there is a protruding section protruding from the center, and so that there are two concave sections on either side of metal plates in which are installed magnets. Moreover, each of the metal plates contains magnets of the same magnetic pole, and the protruding sections of the metal plates are made to be in contact with the piping. Because the "T" shape structure of the metal plates provides magnetic power guided by differing magnetic poles, the magnetic power is able to penetrate more deeply into the piping, thus enabling the lengthwise flow of liquid through the flattened out section to be more effectively magnetized.

Another objective of the present invention is to provide a liquid magnetizer able to increase the efficiency of the magnetizing, wherein, two magnets, are installed on two metal plates, and in an arrangement in which the poles of the same magnetic direction are made to face each other, so that each plate comprises two differing magnetic poles. In this way the magnetic field of the magnetizer is able to penetrate the piping, and to increase the degree of magnetization inside the connecting piping.

One other objective of the present invention is to, bearing in mind the scope of possibility in respect to changing the shape of the piping, install a flattened section of piping, and in this way allow for closer access to the center of the piping, thus increasing the efficiency of the magnetization process.

One other objective of the present invention involves making detailed design innovations, which will be described in the detailed explanation that follows. By reading this explanation and referring to the accompanying illustrations, a better understanding of the design's technological characteristics can be obtained.

DETAILED DESCRIPTION OF THE PREFERRED EMBODIMENTS

Firstly, please refer to FIGS. 4, 5, and 6, the present invention is particularly to construct a frame around the piping, comprise two magnets 10, and two metal plates 40, wherein, metal plates 40 appear in cross-section as "T" shaped, so that a shape in which magnet set 10 is placed on either side of concave section 41, and in which protruding section 42 is seen as pointing inwards towards the center, and is in contact with the outer wall of piping 30, is created. In this way metal plate 40 and piping 30 are able to fit more closely together.

As can be seen in FIGS. 5 and 6, when the two metal plates 40 are fitted together, the outer surface area of protruding section 42 is in close contact with piping 30, so that the two concave sections 41 are facing each other to form an indented space, and the two magnets 40 are installed in this space, so that each of the poles of the two magnets 40 are facing a pole of the same magnetic direction (thus each of the N poles of magnets 10 are affixed to each of the metal plates 40, and, likewise, each of the S poles are affixed to each of the metal plates 40).

As is shown in FIG. 5, when the present invention is installed on piping 30, each of the metal plates 40 contains a magnets comprising differing magnetic poles (N pole S pole), and that the surface area of the protruding section 42 of the metal plates 40 is in contact with the outer walls of piping 30, and in this way the magnetic field is able to easily penetrate into the interior of piping 30, strengthening the effect of the magnets in respect to the lengthwise flow of liquid, and hence increasing the efficiency of magnetization of the said liquid.

In instances where it is possible to make changes to the structure of piping 30, connecting piping 50 can be connected in series to piping 30 (as is shown in FIG. 7 and its accompanying figure, FIG. 8) is flattened out to form a flattened out section 51, so that flattened out section 51 appears in cross-section as an elongated elliptical shape, and either end of connecting piping 50 are connected to piping 30 at connecting point 52, and metal plates 40 and the magnets 10 form a frame around the flattened out section 51, and the protruding section 42 of the metal plates 40 are placed in contact with the flattened out section 51, and in this way the center of the connecting piping is made to lie closer to the walls of the pipe, thus increasing the strength of the magnetic field in the interior of the flattened out section 51, and in this way the efficiency of the magnification process increases.

It can be seen in FIG. 8, that the metal plates 40 on the two differing ends of flattened out section 50, have differing magnetic poles (N,S), making it easier for the magnetic field to penetrate into the center of the flattened out section 51, and in this way the magnetizing process in respect to the liquid flowing through the concave section 441 is made more efficient. With respect to conventional liquid magnetizers, there is no possible arrangement of magnetic poles that would be able to produce the same effect.

The height of the protruding section 42 on metal plate 40 must be decided on the basis of the thickness of the flattened out section 51, so if the height of the protruding section 42 changes, the radius of the piping must also change.

Furthermore, in respect to adjustments made to the area surrounding piping 30, the said adjustments are made to accord in terms of set size-ratios to the cross-sectional area of the piping, and, moreover, no restrictions exist in respect to the size of magnets 10, and in this way the power of magnets 10 can be increased, and in this way increase the effect of the magnetization process in respect to the liquid.

The material of magnets 10 can include various types of permanent magnetic materials, such as strontium iron, barium, borom iron neodymium and copper nickel aluminum, or other materials able to produce a magnetizing effect over a period of time.

Moreover, because the flattened out section of the piping can influence the speed and volume of liquid flow, care should be taken to attach the flattened out section to the piping in a way that is most beneficial to the over-all operation of the system.

When compared to that part of the structure of conventional magnetizers that determines the way in which the magnetic field produced by the magnetizer is positioned in respect to the walls of the piping, it can be seen that the magnetic field produced by the present invention, in respect to the way it is positioned in relation to the flattened out and interior section of the piping, enables the lengthwise flow of the liquid to come into closer contact with the magnetic poles, and thus significantly increases the efficiency of the magnetization process. Moreover, because there is no limitation in respect to the size of magnets, the power of the magnets in respect to the liquid flow is effectively increased.

The characteristics of present invention consist of a simple structure able to increase the efficiency of the magnetization process, and this innovation represents an advance in technology, as well as being useful, and therefore a formal application to grant patent rights is hereby made, and it is also declared that this application is a fully legal application.

Figure 1:
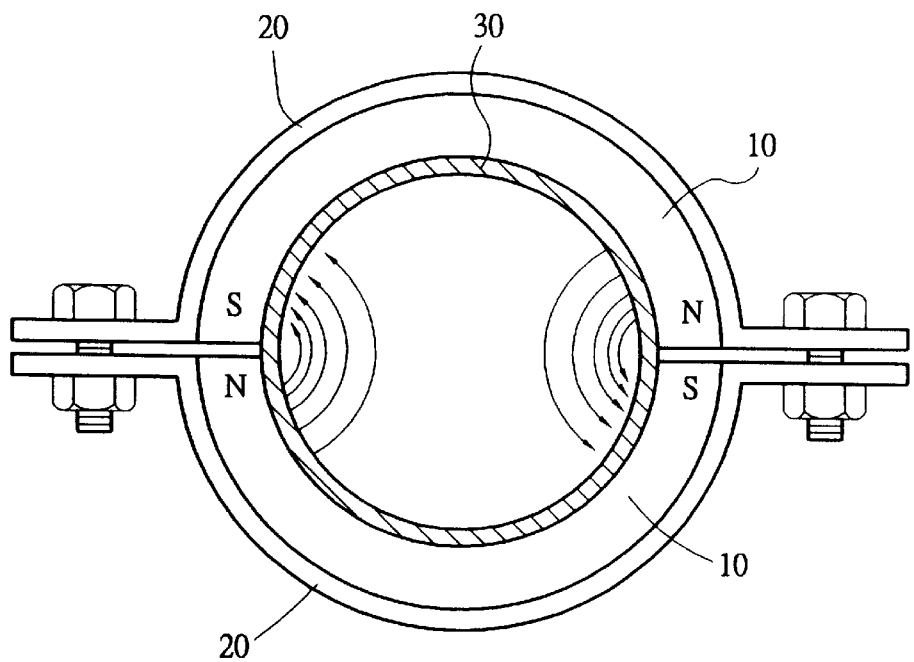
FIG. 1 is a bird's eye view drawing of a conventional magnetizer.
Figure 2:
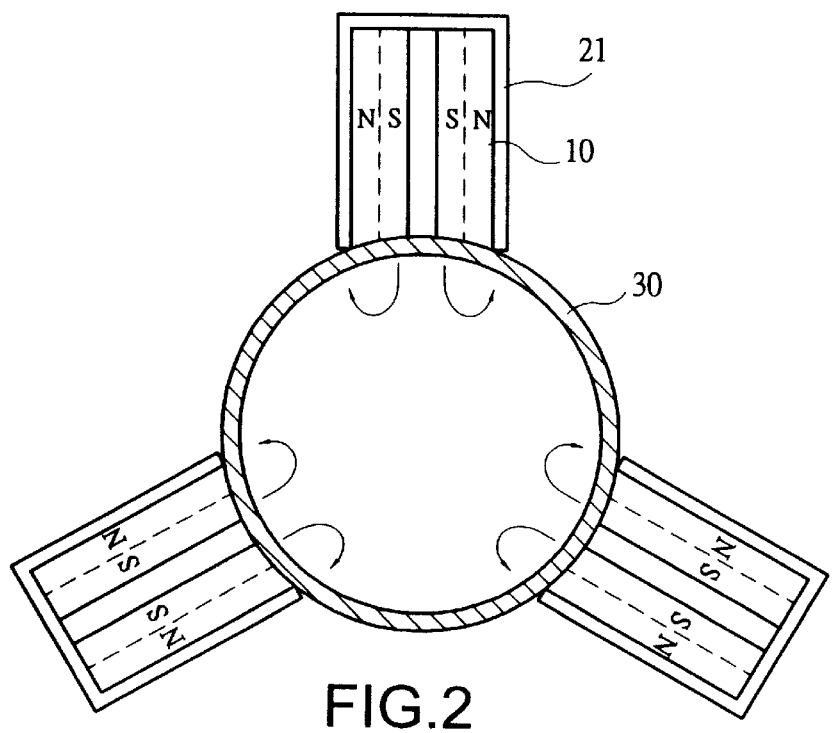
FIG. 2 is another bird's eye view drawing of a conventional magnetizer.
Figure 3:
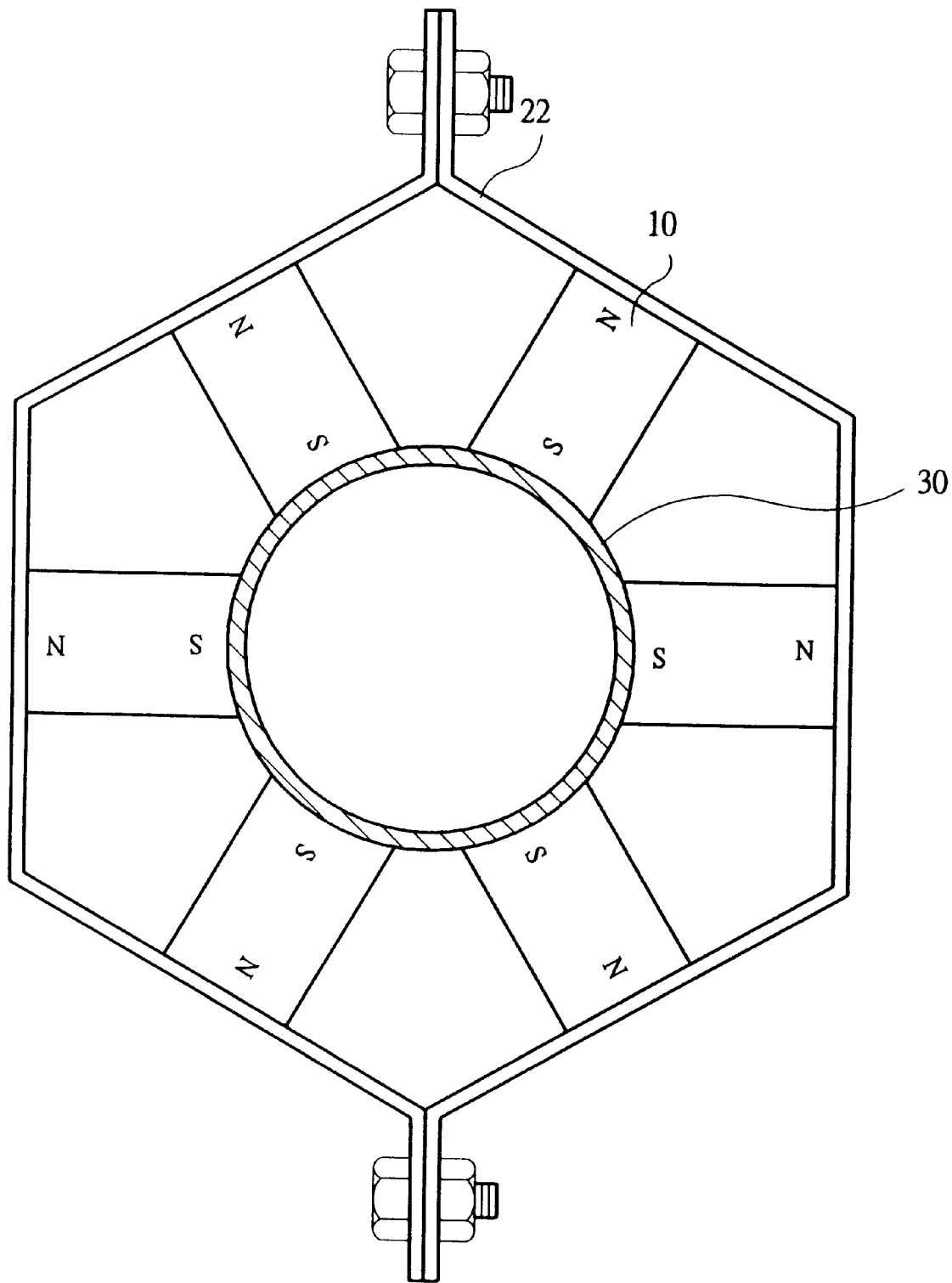
FIG. 3 is one other bird's eye view drawing of a conventional magnetizer.
Figure 4:
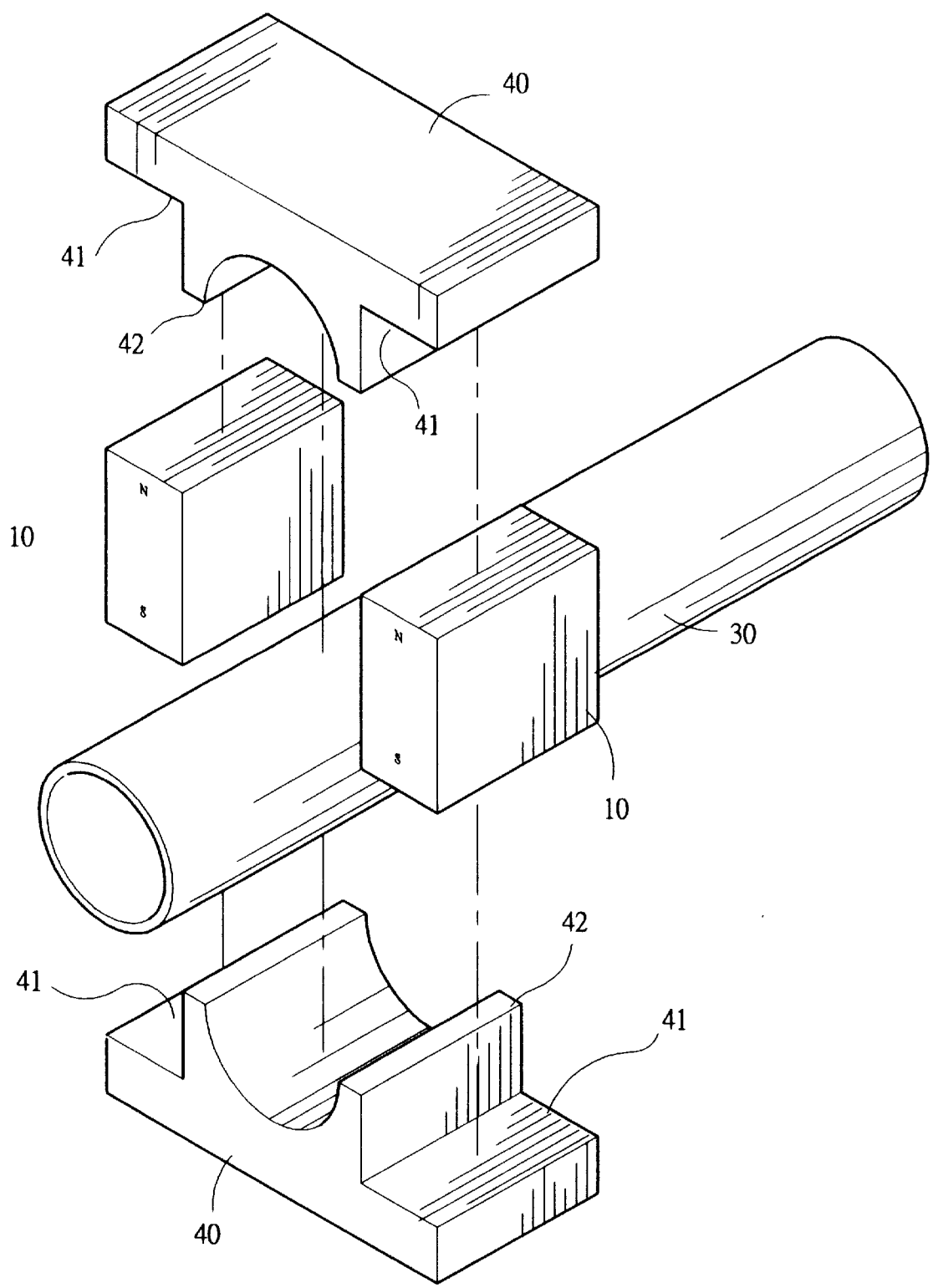
FIG. 4 is an exploded drawing showing the piping in respect to the first embodiment of the present invention.
Figure 5:
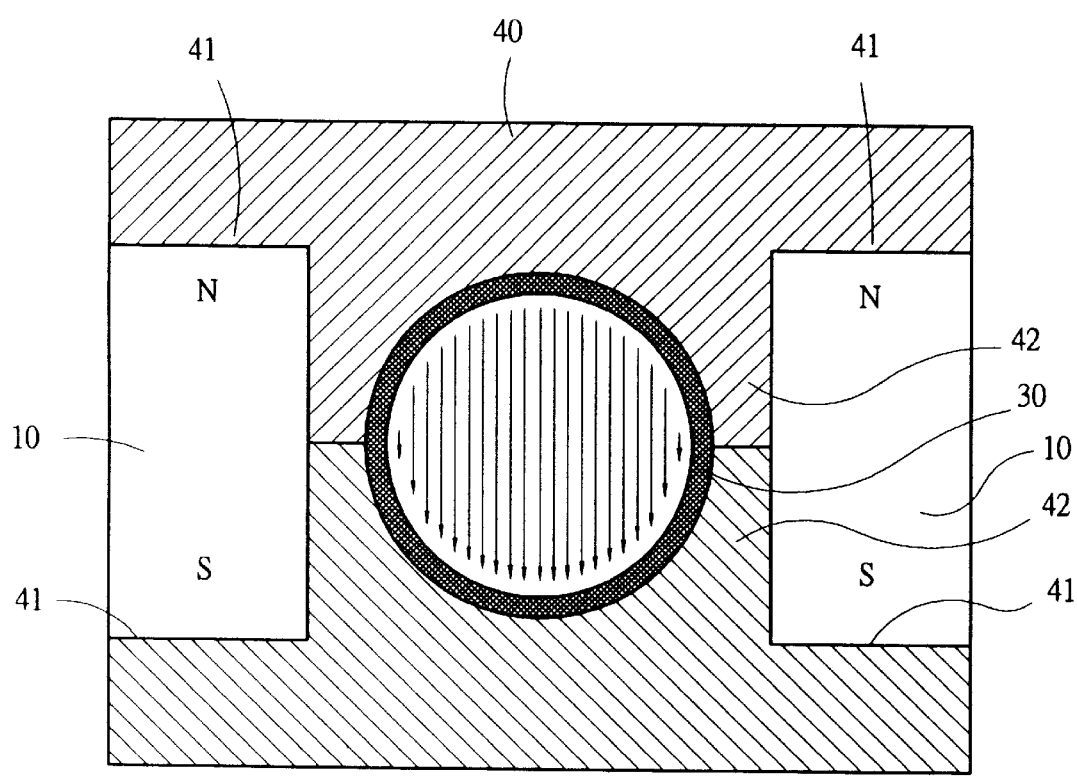
FIG. 5 is a cross-sectional drawing showing the piping in respect to the first embodiment of the present invention.
Figure 6:
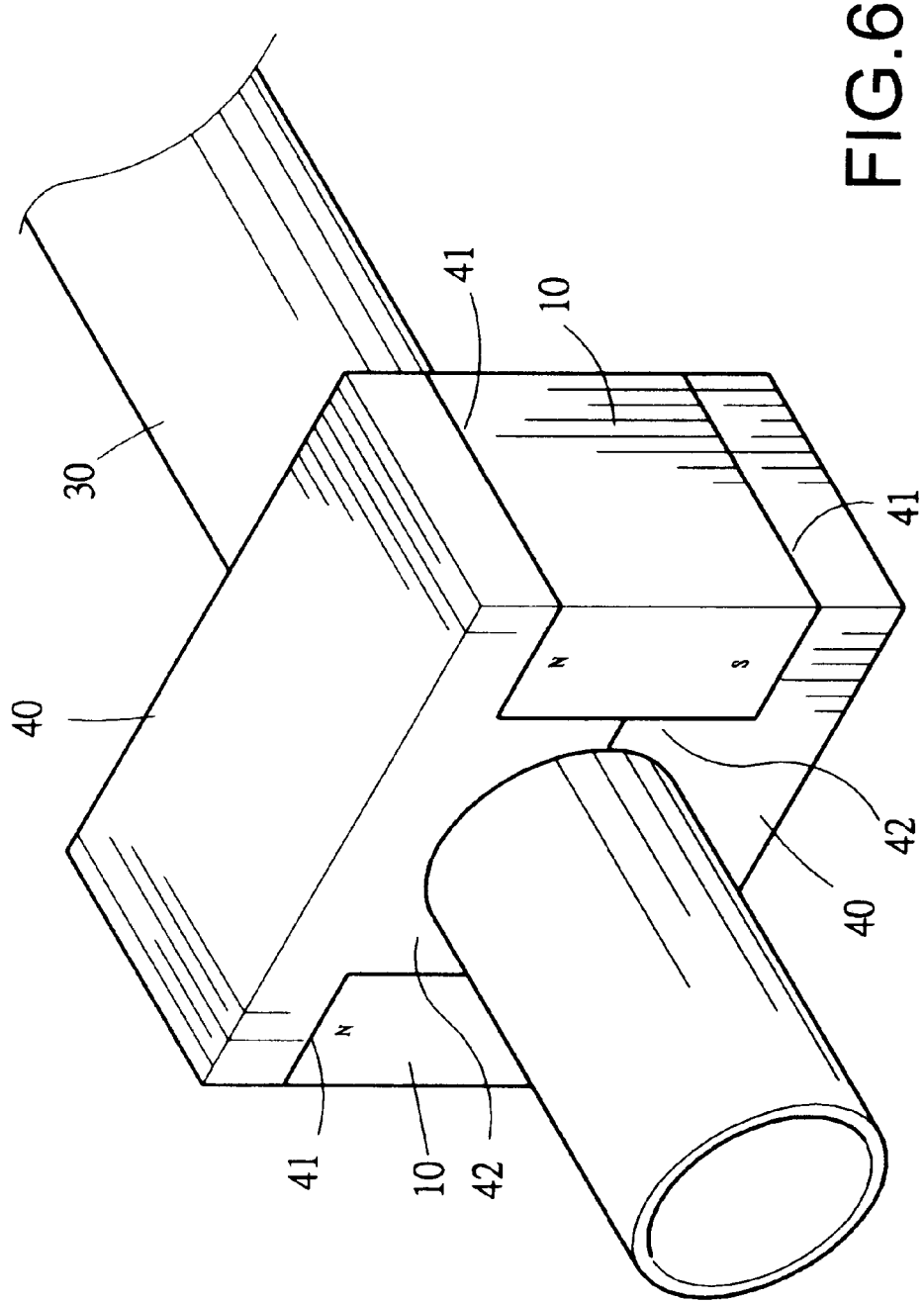
FIG. 6 is a schematic drawing showing the piping in respect to the assembled state of the first embodiment of the present invention.
Figure 7:
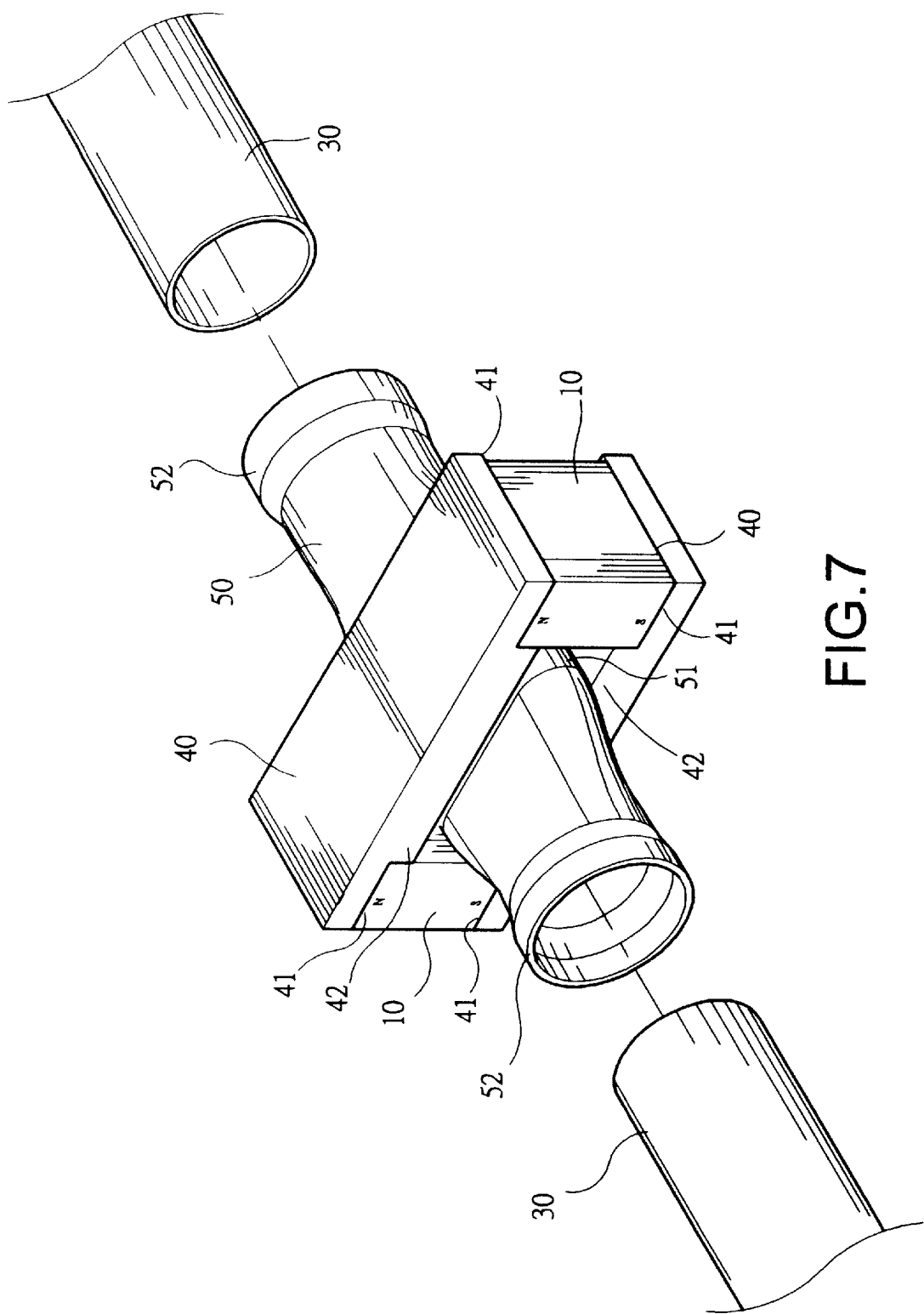
FIG. 7 is a schematic drawing showing the piping in respect to the second embodiment of the present invention.
Figure 8:
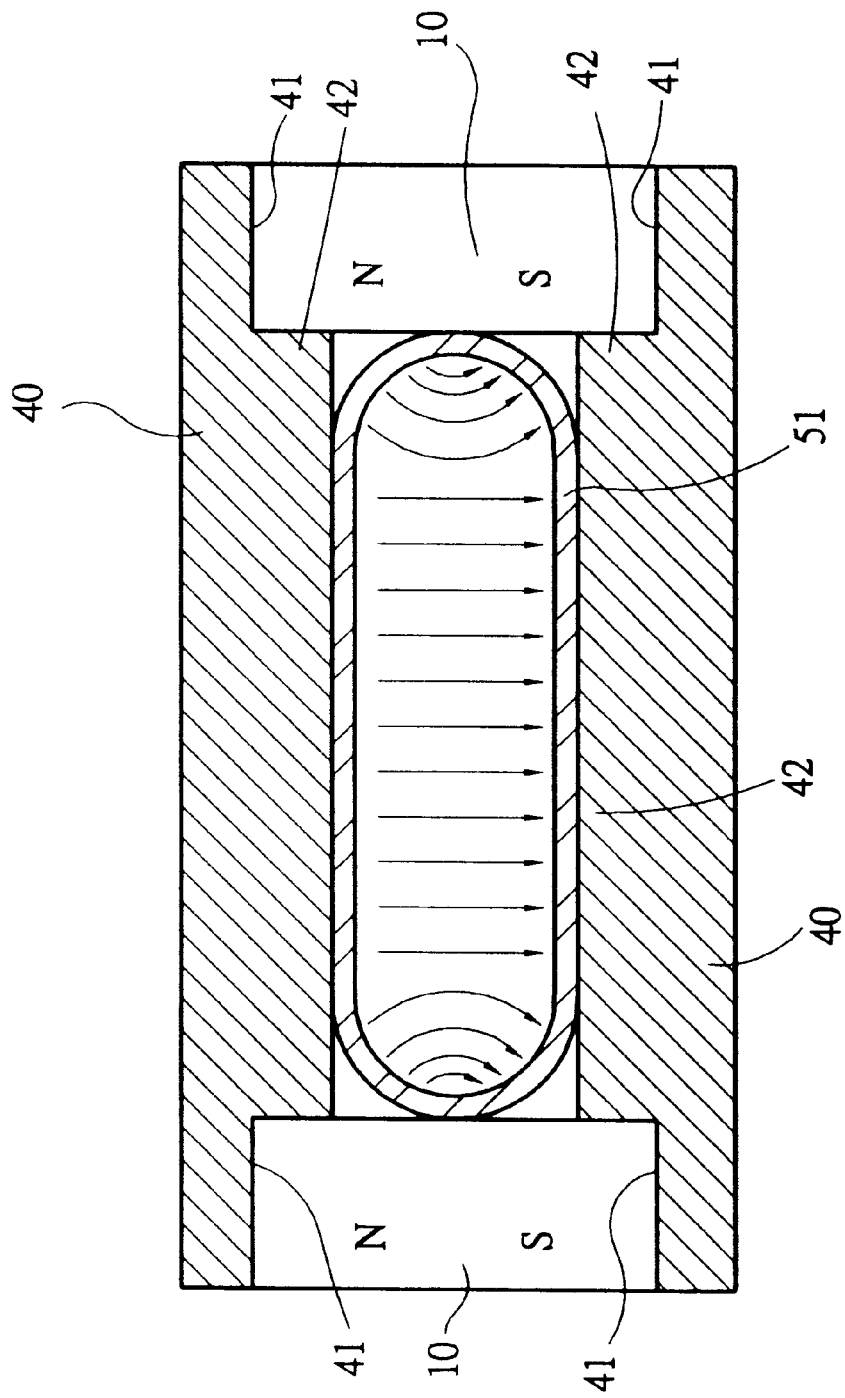
FIG. 8 is a cross-sectional drawing showing the piping in respect to the second embodiment of the present invention.

What is claimed is:

1. A liquid magnetizer in the form of a frame placed over piping, comprising two metal plates with the capacity to undergo the magnetization process, has the following characteristics:

the metal plates appear in cross section as a "T" shape with two concave sections on either side, forming a protruding section protruding from the center, and said two concave sections on either side of metal plates in which are installed magnets; each of the metal plates contains magnets of the same magnetic pole, by assembling, the protruding sections of the metal plates are made to be in contact with the piping.

2. A liquid magnetizer in accordance with claim 1, wherein, the protruding section of the metal plates is installed so that the outer walls of the piping are in direct contact with it.

3. A liquid magnetizer in accordance with claim 1, wherein said piping comprises connecting piping connectable with other piping of the present invention, and the two metal plates and the two magnets are placed around the said connecting piping, and the connecting piping is installed to fit into the protruding sections of the metal plates and its middle part forming a flattened out section, that in cross-section appears as an elongated elliptical shape.

* * * * *